United States Patent
Taskin et al.

(10) Patent No.: US 9,394,419 B2
(45) Date of Patent: Jul. 19, 2016

(54) COLUMN FILLING MATERIAL AND A PRODUCTION METHOD THEREOF

(71) Applicant: ISTANBUL TEKNIK UNIVERSITESI, Istanbul (TR)

(72) Inventors: Omer Suat Taskin, Istanbul (TR); Baris Kiskan, Istanbul (TR); Yusuf Yagci, Istanbul (TR); Abdullah Aksu, Istanbul (TR); Nuray Balkis, Istanbul (TR)

(73) Assignee: ISTANBUL TEKNIK UNIVERSITESI, Istanbul (TR)

( * ) Notice: Subject to any disclaimer, the term of this patent is extended or adjusted under 35 U.S.C. 154(b) by 0 days.

(21) Appl. No.: 14/762,475

(22) PCT Filed: Sep. 19, 2014

(86) PCT No.: PCT/TR2014/000332
§ 371 (c)(1),
(2) Date: Jul. 22, 2015

(87) PCT Pub. No.: WO2015/076762
PCT Pub. Date: May 28, 2015

(65) Prior Publication Data
US 2015/0353702 A1    Dec. 10, 2015

(30) Foreign Application Priority Data

Nov. 19, 2013   (TR) .................................. 2013 13450

(51) Int. Cl.
*B01J 20/00* (2006.01)
*B01J 20/22* (2006.01)
(Continued)

(52) U.S. Cl.
CPC ...... *C08J 9/286* (2013.01); *B01J 20/22* (2013.01); *B01J 20/262* (2013.01); *B01J 20/264* (2013.01); *B01J 20/282* (2013.01); *B01J 20/285* (2013.01);
(Continued)

(58) Field of Classification Search
None
See application file for complete search history.

(56) References Cited

U.S. PATENT DOCUMENTS

| 3,177,214 A | 4/1965 | Sulzer |
| 4,851,528 A * | 7/1989 | Stead ............... C07K 1/20 544/189 |

(Continued)

FOREIGN PATENT DOCUMENTS

| EP | 0217510 A2 | 4/1987 |
| JP | S5629162 A | 3/1981 |

(Continued)

OTHER PUBLICATIONS

Wang Zhang et al: "Microwave-assisted synthesis of highly fluorescent nanoparticles of a melamine-based porous covalent organic framework for trace-level detection of nitroaromatic explosives", Journal of a Hazardous Materials, Elsevier, Amsterdam, NL, vol. 221, Apr. 10, 2012, pp. 147-154.

(Continued)

*Primary Examiner* — Kara Boyle
(74) *Attorney, Agent, or Firm* — Gokalp Bayramoglu

(57) ABSTRACT

The present invention relates to a column filling material which is filled inside the columns used in chromatographic analysis of aromatic hydrocarbons, alkaloids, flavonoids and pesticides and provides high adsorption by means of its porous structure, and a production method thereof essentially comprising the steps of dissolving melamine and anthraquinone in a solvent (11), carrying out the reacting by refluxing the solution (12), washing the material obtained after reflux (13), drying the washed material by freezing (14).

10 Claims, 2 Drawing Sheets

(51) Int. Cl.
  *B01J 20/282* (2006.01)
  *B01J 20/285* (2006.01)
  *B01J 20/30* (2006.01)
  *B01D 15/00* (2006.01)
  *C08J 9/28* (2006.01)
  *B01J 20/26* (2006.01)

(52) U.S. Cl.
  CPC .............. *B01J 20/30* (2013.01); *B01J 20/3071* (2013.01); *B01J 20/3085* (2013.01); *B01J 20/3092* (2013.01); *B01J 2220/54* (2013.01); *B01J 2220/58* (2013.01); *C08J 2361/20* (2013.01)

(56) References Cited

U.S. PATENT DOCUMENTS

| | | |
|---|---|---|
| 4,986,908 A | 1/1991 | Stout et al. |
| 2009/0095676 A1 | 4/2009 | Numata et al. |

FOREIGN PATENT DOCUMENTS

| | | |
|---|---|---|
| WO | WO2012/039683 A1 | 3/2012 |
| WO | WO2013/081552 A1 | 6/2013 |

OTHER PUBLICATIONS

Yang G et al: "Facile synthesis of melamine-based porous polymer networks and their application for removal of aqueous mercury ions", Polymer, Elsevier Science Publishers B.V, GB, vol. 51, No. 26, Dec. 10, 2010, pp. 6193-6202.

Matthias Georg Schwab et al: "Catalyst-free Preparation of Melamine-Based Microporous Polymer Networks through Schiff Base Chemistry", Journal of the American Chemical Society, vol. 131, No. 21, Jun. 3, 2009, pp. 7216-7217.

Matthias Georg Schwab et al: "Preparation of Microporous Melamine-based Polymer Networks in an Anhydrous High-Temperature Miniemulsion," Macromolecular Rapid Communications, vol. 32, No. 22, Sep. 15, 2011, pp. 1783-1803.

* cited by examiner

COLUMN FILLING MATERIAL AND A PRODUCTION METHOD THEREOF

FIELD OF THE INVENTION

The present invention relates to a column filling material which is filled inside the columns used in chromatographic analysis of aromatic hydrocarbons, alkaloids, flavonoids and pesticides and provides high adsorption by means of its porous structure due to its high surface area, and a production method thereof.

BACKGROUND OF THE INVENTION

Chromatography is a strong composition and purification method which is used to separate material mixtures having similar features. It can be defined as separating a composition to its components on a porous fixed phase by means of a moving solvent as a result of the different movements of the compounds forming the composition. The fixed phase can be solid and liquid, the mobile phase can be liquid and gas. The composition which is wanted to be separated is passed through the fixed phase with the help of the mobile phase. Since the components forming the composition are kept in different measurements by the fixed phase, each component leaves the system in different times. Therefore, it is possible to separate the compounds from each other, define and collect separately. Even though the chromatography can be classified in different ways, it essentially operates through adsorption and partition mechanisms.

Column chromatography is the first method which is applied and it is the start of the chromatography. Today, surface active materials such as silica gel ($SiO_2$), cellulose, aluminum oxide ($Al_2O_3$), zeolite, calcium carbonate and the like are used in column chromatography, and the organic solvents are used as mobile phase. In this method, the composition to be separated is dissolved in a suitable solvent, and it is passed through a solid fixed phase (filling material) filled in a column. The components in the column are absorbed by a fixed phase. Then the components are taken from the bottom of the column separately by passing the solvent in which the composition to be separated is dissolved or the solvent in different polarity through the column. After that, the solvent is removed by vaporizing and pure material is obtained.

The porosity of the material to be used as column filling material being high is preferred since it will increase the adsorption. Producing a material with, high porosity is very high cost. Today, the production of materials used as filling material in column chromatography is realized in different methods, requires high costs.

United States Patent Document no US2009095676, an application known in the state of the art, discloses a chromatography carrier which can recover aromatic compounds such as polychlorinated biphenyls (PCB) and polycyclic aromatic hydrocarbons (PAH) from other substances and a filling material filled in the column. It is disclosed that the said material which is obtained by immobilizing an organic group comprising sulfoxide exhibits high efficiency in separating organic compounds.

Japanese Patent document no JPS5629162, an application known in the state of the art, discloses a column material the separating property of which is enhanced, and a synthesis method used in liquid chromatoghraphy. The column material can be obtained by dissolving a thermoplastic resin such as polyacrylnitorile in a solvent and adding polyethylene glycol. It is disclosed that the said material provides high adsorption and it is used in separating aromatic hydrocarbons, alkaloids, flavonoids and pesticides.

SUMMARY OF THE INVENTION

The objective of the present invention is to provide a column filling material used in high performance liquid chromatography.

Another objective of the present invention is to provide a column filling material which has high porosity and adsorption capacity.

Yet another objective of the present invention is to provide a column filling material used especially in analysis of aromatic hydrocarbons, alkaloids, flavonoids and pesticides.

A further objective of the present invention is to provide a column filling material production method which is easy and low cost.

BRIEF DESCRIPTION OF THE DRAWINGS

A column filling material and production method thereof developed to fulfill the objective of the present invention is illustrated in the accompanying figures, in which.

DETAILED DESCRIPTION OF THE INVENTION

Figure 1:
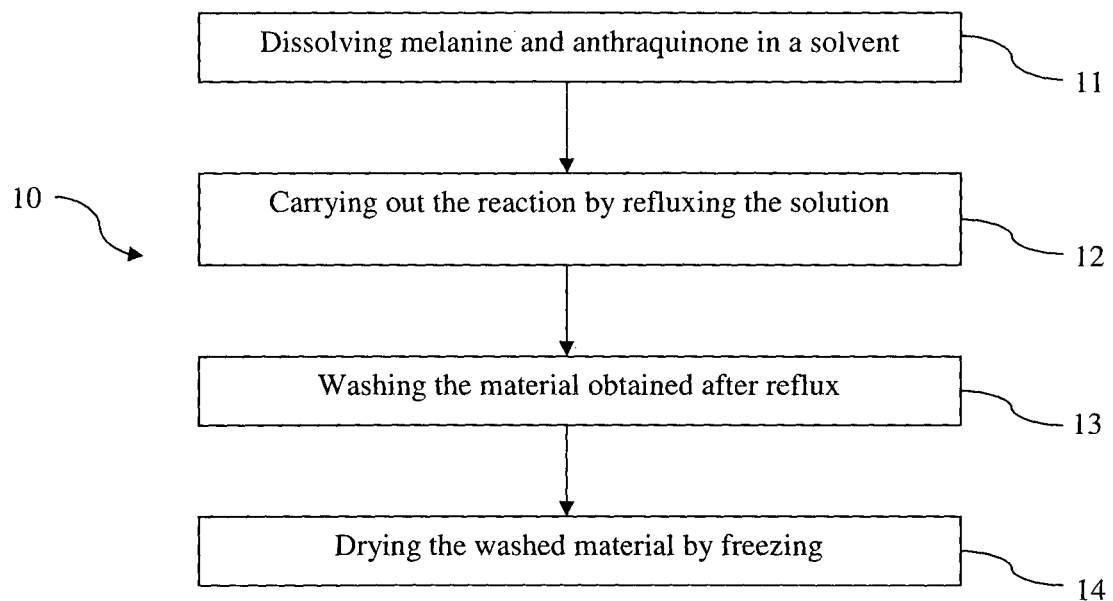
FIG. 1 is the flow chart of the inventive column filling material production method.
Figure 2:
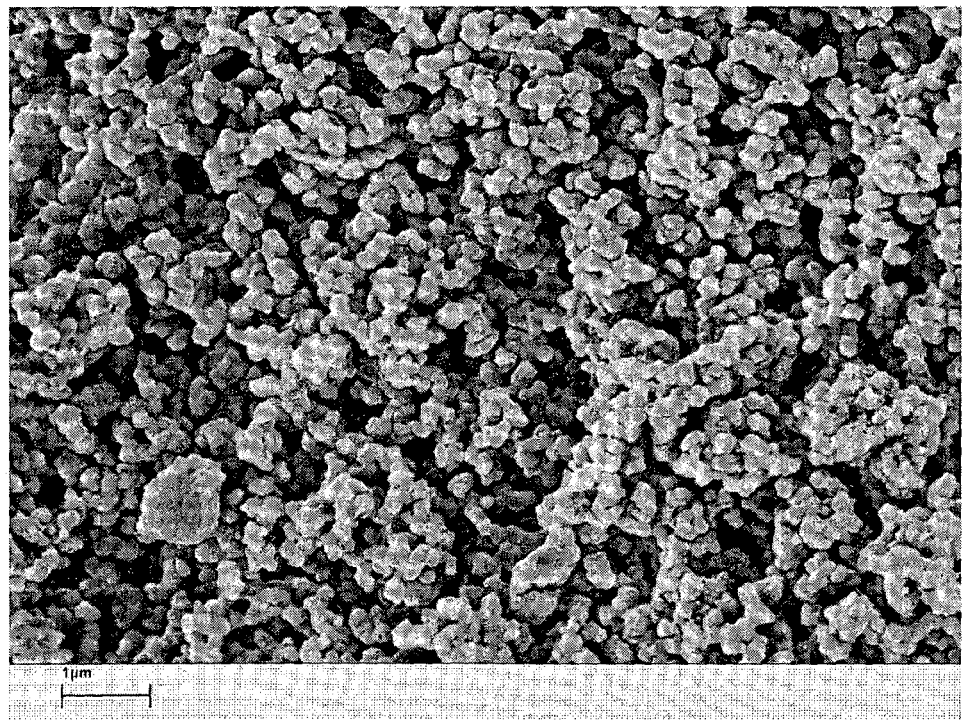
FIG. 2 is the SEM view of the inventive column filling material.
Figure 3:
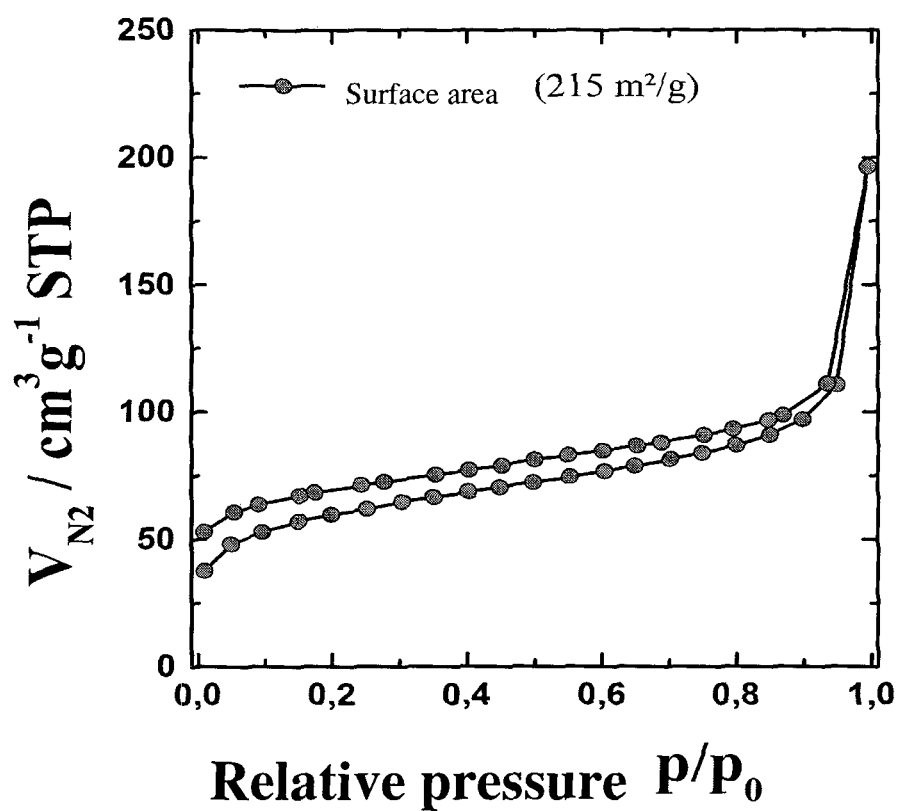
FIG. 3 is the pore surface area graph of the inventive column filling material measured with nitrogen porosimetry.

The inventive column filling material production method (10) comprises the steps of dissolving melamine and anthraquinone in a solvent (11), carrying out the reaction by refluxing the solution (12), washing the material obtained after reflux (13), drying the acquired material (14).

In the inventive method (10) first the raw materials comprised of melamine and anthraquinone are dissolved in a solvent (11). In the preferred embodiment of the invention, 3 moles of 1,5-dihydroxy anthraquinone is used for 2 moles of melamine. At least one of dimethyl sulfoxide, dimethyl formamide, toluene, 1,4-dioxane and butyl acetate is preferred as solvent.

The prepared solution is then subjected to reflux and thus the reaction is realized (12), and the inventive material is synthesized. In the preferred embodiment of the invention, reflux process is performed for 70-90 hours at 150-180° C.

With reflux process (12) melamine reacts with anthraquinone and benzoxazine is synthesized. The said reaction is as follows:

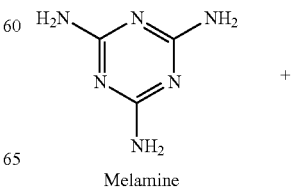

Melamine

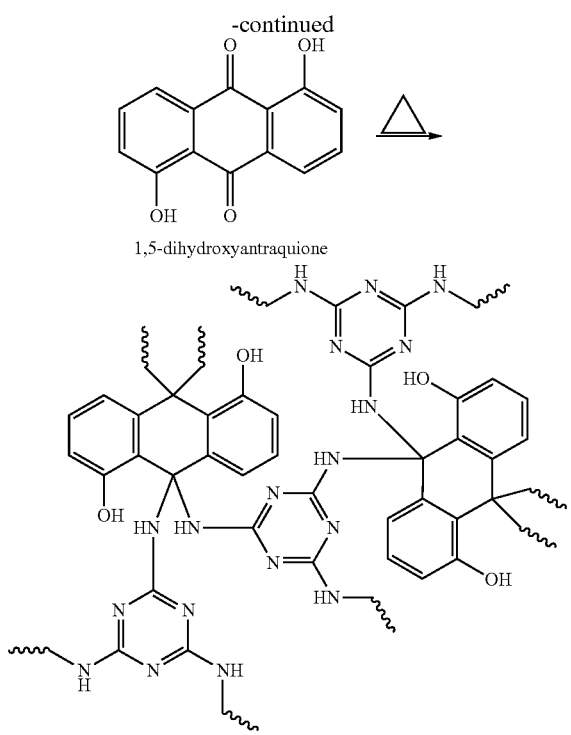

1,5-dihydroxyantraquione

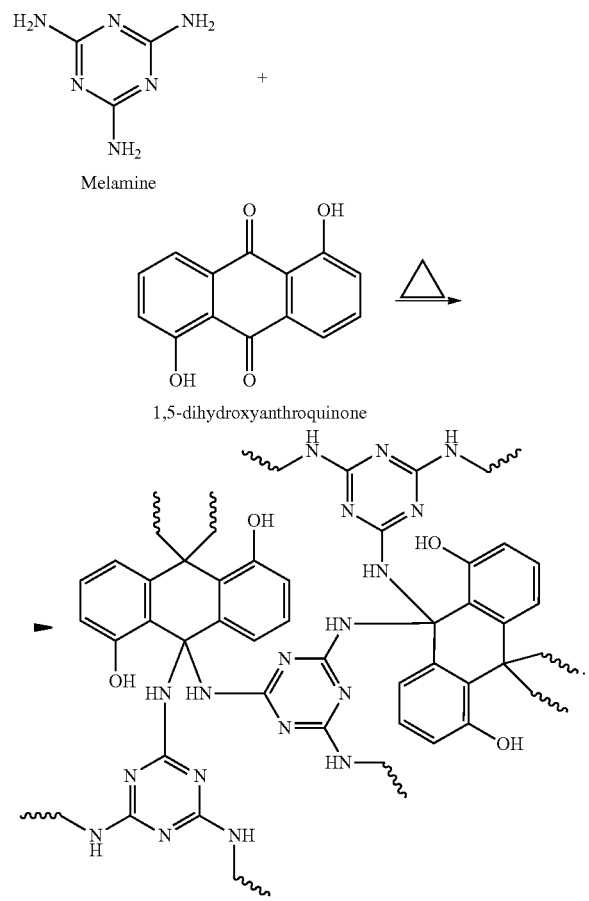

1,5-dihydroxyanthroquinone

The benzoxazine obtained with reflux (12) is washed with a selected solvent or solvents until it reaches the desired purity (13). At least one of the solvents such as dimethylsulfoxide, tetrahydrofaran and dichloromethane, chloroform, diethylether, acetone, methanol, ethylacetate, toluene is preferred as solvent.

Finally the washed material is dried by freezing (14) in order to remove the impurities and to make ready to be filled in the column, and thus pure column filling material in high porosity is obtained.

The column filling material which is obtained with the inventive method (10) is filled in the high performance liquid chromatography (HPLC) column under pressure. With the chromatographic column prepared in this way, the analysis of compounds such as polycyclic aromatic hydrocarbons (PAH), pesticides, flavonoids and alkaloids is performed.

The invention claimed is:

1. A method for producing a porous column-filling material, the material of which is used to fill columns used in chromatographic analysis and the material of which provides adsorption by means of its porous structure, comprising the steps of:
dissolving a melamine and an anthraquinone in a solvent,
carrying out a reaction between the melamine and the anthraquinone by
refluxing the solution to form a material,
washing the material obtained by reflux, and
drying the washed material by freezing.

2. The method according to claim 1, wherein in the step of dissolving the melamine and the anthraquinone in a solvent, the anthraquinone comprises 1,5-dihydroxyanthraquinone, and wherein 3 moles of the 1,5-dihydroxyanthraquinone is reacted with 2 moles of the melamine.

3. The method according to claim 1, wherein in the step of wherein in the step of dissolving the melamine and the anthraquinone in a solvent, the solvent is selected from the group consisting of dimethyl sulfoxide, dimethyl formamide, toluene, 1,4-dioxane, butyl acetate, and mixtures thereof.

4. The method according to claim 1, wherein in the step of carrying out a reaction between the melamine and the anthraquinone by refluxing the solution, the reaction is carried out for 70 to 90 hours at a temperature of from 150° to 180° C.

5. The method according to claim 2, wherein in the step of carrying out a reaction between the melamine and the anthraquinone by refluxing the solution, the porous material is formed via the reaction of the melamine with the anthraquinone.

6. The method according to claim 5, wherein in the step of carrying out a reaction between the melamine and the anthraquinone by refluxing the solution, the reaction of the melamine and the anthraquinone to form the porous material is as follows:

7. The method according to claim 5, wherein in the step of washing the material obtained by reflux, the porous material is washed with at least one solvent until it reaches a desired purity.

8. The method according to claim 7, wherein in the step of washing the material obtained by reflux, the solvent is selected from the group consisting of dimethylsulfoxide, tetrahydrofuran, dichloromethane, chloroform, diethylether, acetone, methanol, ethyl acetate, and toluene.

9. The method according to claim 1, wherein the step of drying the washed material by freezing is conducted in order to remove impurities and to make the material ready to fill a column.

10. A porous column-filling material produced by the method according to claim 1, wherein the porous column-filling material is used to fill a column for high performance liquid chromatography (HPLC) under pressure, and the porous column-filling material is used in the analysis of compounds selected from the group consisting of polycyclic aromatic hydrocarbons (PAH), pesticides, flavonoids, and alkaloids.

* * * * *